(No Model.)

H. F. ANAWALT.
COFFEE POT HANDLE.

No. 465,747.          Patented Dec. 22, 1891.

WITNESSES:
J. L. Durand
Gemet S. Jones

INVENTOR:
Harry F. Anawalt
by Louis Bagger & Co.
his Attorneys.

UNITED STATES PATENT OFFICE.

HARRY F. ANAWALT, OF KOKOMO, INDIANA.

COFFEE-POT HANDLE.

SPECIFICATION forming part of Letters Patent No. 465,747, dated December 22, 1891.

Application filed May 8, 1891. Serial No. 392,045. (No model.)

*To all whom it may concern:*

Be it known that I, HARRY F. ANAWALT, a citizen of the United States, and a resident of Kokomo, in the county of Howard and State of Indiana, have invented certain new and useful Improvements in Coffee-Pot Handles; and I do hereby declare that the following is a full, clear, and exact description of the invention, which will enable others skilled in the art to which it appertains to make and use the same, reference being had to the accompanying drawings, which form a part of this specification, and in which—

Figure 1:
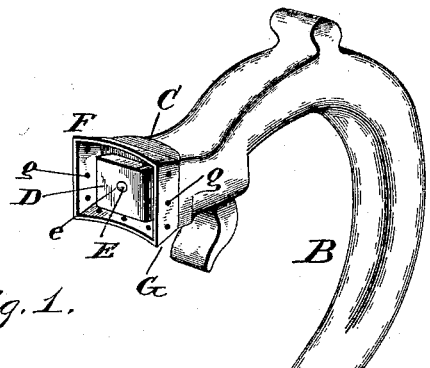
Figure 2:
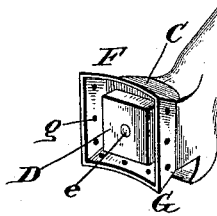
Figure 3:
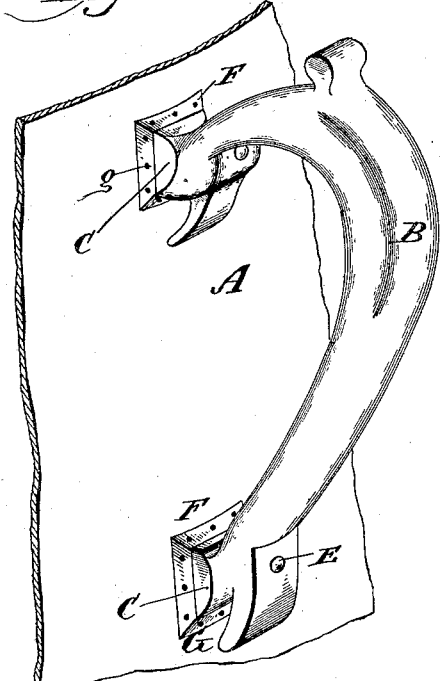
Figure 3:
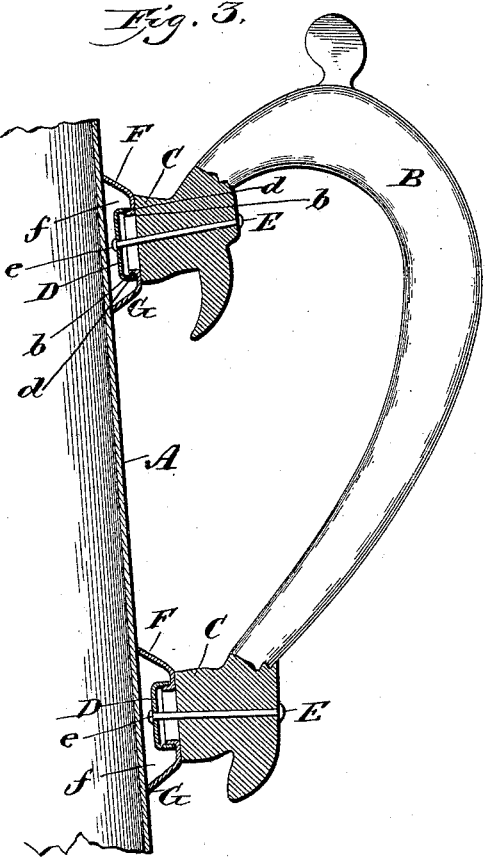

Figure 1 is a perspective view of my improved handle removed from the pot. Fig. 2 is a similar view, but showing it in position upon a coffee-pot; and Fig. 3 is a longitudinal sectional view of the handle, showing it as when fastened upon a coffee-pot.

Like letters of reference denote corresponding parts in all the figures.

This invention relates to handles for coffee-pots and other utensils of a like nature which are provided with a rigid handle, and has for its object to so construct the handle that it will keep cool and not burn the fingers in handling the pot.

To this end my improvement consists in making a handle of wood in one piece and providing the same with peculiar attachments for fastening it rigidly to the coffee-pot or other utensil to which it is to be applied in such a manner that the heat will not readily be transmitted from the hot body of the pot to the handle.

Referring to the drawings, the letter A designates part of the body of a coffee-pot provided with my improved handle, which is shown at B. The latter is made from wood in one piece and of any suitable size and shape. The wood is coated with an even layer of a hard and fine enamel to give it a smooth and pleasant "feel" to the hand and a finished appearance.

That part of the handle which is next to the body A of the coffee-pot is formed of square or rectangular shape, as shown at C C, its inner end being covered by a square metallic cap D, which is held in place by a wire nail E, inserted transversely through the square portion of the handle and having its inner pointed end flattened down and soldered upon the outside of the metallic cap D, as shown at *e*.

Upon each end of the handle is further placed a shallow sheet-metal box F, of square or rectangular shape to conform to the shape of the abutments C and having outwardly-flaring sides or flanges G. These flanges may be perforated, as shown at *g*, to permit air to pass into and through the shallow air-chambers *f*, formed by these abutment-boxes F, the rims of the flanges G being soldered to the adjacent side A of the pot. The boxes F are held securely in place upon opposite ends of the handle by the flanges *d* of the cap-plates D overlapping the flanges *b* at the inner end of the abutment-boxes F, as illustrated in Fig. 3, and soldered thereto. By this construction and combination of the squared abutments C, cap-plates D, fastening-nails E, and abutment-boxes F the handle is fastened upon the pot in a very solid and substantial manner, leaving air-chambers *f* at both ends, which will effectually prevent the handle from becoming unduly heated.

It will be obvious that I do not confine my improvements to coffee-pots; but that the same may be employed advantageously for all other purposes where non-conducting handles are desirable.

Having thus described my invention, I claim and desire to secure by Letters Patent of the United States—

As an improved article of manufacture, the herein-described non-conducting handle, comprising the wooden enameled body B, having end abutments C C, in combination with the cap-plates D, having flanges *d*, the abutment-boxes F, having flaring sides G and flanges *b*, and the fastening-nails, substantially as described.

In testimony that I claim the foregoing as my own I have hereunto affixed my signature in presence of two witnesses.

HARRY F. ANAWALT.

Witnesses:
  AMOS R. WOODS,
  DAVID L. RATLIFF.